United States Patent [19]
Ning et al.

[11] 3,846,410

[45] *Nov. 5, 1974

[54] 3-SUBSTITUTED-7-HYDROXY LOWER ALKYL BENZODIAZEPINES

[75] Inventors: Robert Ye-Fong Ning, West Caldwell; Leo Henryk Sternbach, Upper Montclair, both of N.J.

[73] Assignee: Hoffmann-La Roche Inc., Nutley, N.J.

[ * ] Notice: The portion of the term of this patent subsequent to Aug. 8, 1989, has been disclaimed.

[22] Filed: Dec. 10, 1971

[21] Appl. No.: 206,932

[52] U.S. Cl. .......................... 260/239.3 D, 424/244
[51] Int. Cl. ............................................. C07d 53/06
[58] Field of Search ............................. 260/239.3 D

[56] References Cited
UNITED STATES PATENTS 3,176,009  3/1965  Bell ............................. 260/238.3 D
3,371,085  2/1968  Reeder et al. ................ 260/239.3 D
3,682,892  8/1972  Ye-Fong Ning et al. ..... 260/239.3 D FOREIGN PATENTS OR APPLICATIONS
1,447,040  6/1966  France ......................... 260/239.3 D Primary Examiner—Norma S. Milestone
Assistant Examiner—Robert T. Bond
Attorney, Agent, or Firm—Samuel L. Welt; Bernard S. Leon; William G. Isgro

[57] ABSTRACT

The present invention relates to 7-hydroxy lower alkyl-3-substituted benzodiazepines, compounds of biological interest as muscle relaxants, sedatives and anti-convulsants.

15 Claims, No Drawings

3-SUBSTITUTED-7-HYDROXY LOWER ALKYL BENZODIAZEPINES

DETAILED DESCRIPTION OF THE INVENTION

The present invention relates to 7-hydroxy lower alkyl -3-substituted benzodiazepines of the formula

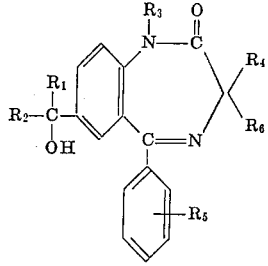

I and of the formula

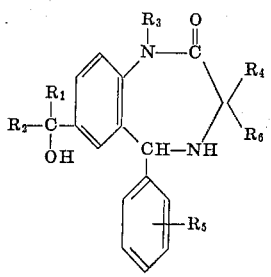

Ia wherein $R_1$, $R_2$, $R_3$ and $R_4$ are each selected from the group consisting of hydrogen and lower alkyl, $R_5$ is selected from the group consisting of hydrogen and halogen and $R_6$ is selected from the group consisting of lower alkanoyloxy and hydroxy.

The term "lower alkyl" as utilized herein, unless otherwise specified, connotes both straight and branched chain $C_1$–$C_6$, preferably $C_1$–$C_4$ hydrocarbon groups, such as methyl, ethyl, propyl, isopropyl, butyl, pentyl, hexyl and the like. By the term "halogen" as utilized herein, there is contemplated all four forms thereof, i.e. chlorine, bromine, fluorine, and iodine, unless otherwise specified. The term "lower alkanoyl" connotes the acyl moiety of a $C_2$–$C_7$ lower alkanoic acid such as acetyl, propionyl, butyryl and the like.

Most preferred are compounds wherein a double bond is contained between positions 4 and 5, i.e. compounds of the formula I above and $R_6$ is hydroxy.

When $R_5$ is halogen, most preferred are the halogens, chlorine or fluorine, most preferentially, fluorine. Also, when $R_5$ is other than hydrogen, it is preferably joined to the 5-phenyl ring at the 2-position thereof. $R_1$ and $R_4$ are preferably hydrogen. Also, in formula I or Ia, the most preferred member of the lower alkyl grouping is methyl.

Thus, as is evident from the above, in formula I or Ia, $R_1$, $R_2$ and $R_3$ are all preferentially hydrogen or methyl, $R_4$ is preferentially hydrogen and $R_5$ is preferentially hydrogen or fluorine and, when fluorine, is joined to the 5-phenyl ring at the 2-position thereof. Most preferred is a compound of the formula I or Ia above wherein $R_1$ is hydrogen, $R_2$ is methyl, $R_3$ is hydrogen or methyl, $R_4$ is hydrogen and $R_5$ is fluorine and $R_6$ is hydroxy.

Compounds of the formula I or Ia above can be prepared starting with the corresponding compound of the formula

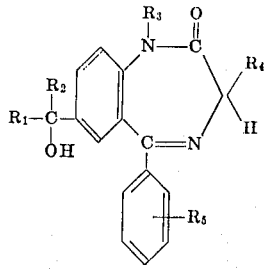

II wherein $R_1$, $R_2$, $R_3$, $R_4$ and $R_5$ are as above.

the preparation of compounds of the formula II above is disclosed in Ning and Sternbach co-pending patent application Ser. No. 101,184, filed Dec. 23, 1970.

More particularly, the compounds of the formula I in the first stage can be prepared from the corresponding compounds of the formula II by first oxidizing the compound of the formula II with any suitable oxidizing agent such as hydrogen peroxide or peracids. Such compounds obtained thusly are of the formula

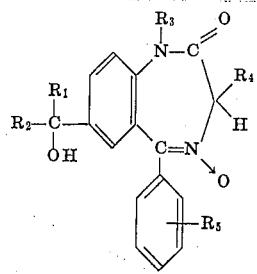

III wherein $R_1$, $R_2$, $R_3$, $R_4$ and $R_5$ are as above.

Compounds of the formula III in addition to being useful in and of themselves for pharmacological purposes are also useful as intermediates in the preparation of compounds of the formula I and Ia above.

Representative of peracids suitable for the oxidation step include peracetic acid, trifluoroperacetic acid, m-chloroperbenzoic acid, perphthalic acid, persulfuric acid and the like.

The desired oxidation can be accomplished in a variety of ways. In one embodiment, a compound of the formula II is added to an acidic medium, followed by the addition of the peracid thereto.

Alternatively, the peracid can be prepared in situ and the compound of the formula II which is to be oxidized can then be added to the resultant mixture whereby a compound of the formula III results. The peracid is prepared by mixing hydrogen peroxide with a straight chain alkanoic acid or a functional derivative thereof, for example, acetic acid, m-chlorobenzoic acid and the like.

Temperature is not a critical feature of the oxidation step in either alternative approach, but it is preferred to effect the oxidation at room temperature or slightly above or slightly below room temperature.

The so-obtained compounds of the formula III can then be rearranged to the compounds of the formula I wherein $R_6$ is lower alkanoyloxy by gently warming a compound of the formula III in the presence of an acylating agent capable of providing the acyl moiety of a $C_2$–$C_7$ lower alkanoic acid. Preferred acylating agents include acid anhydrides, diacyl sulfides or an acid halide (preferably an acid chloride). If $R_6$ is acetoxy, preferred among the many acylating agents are acetic anhydride, diacetyl sulfide or acetyl chloride. Among the many other suitable acylating agents, there can be included propionic acid anhydride, butyric acid anhydride, butyryl chloride, propionyl chloride, dipropionyl sulfide and the like.

The conversion of a compound of the formula III above to the compound of the formula I above wherein $R_6$ is lower alkanoyloxy can be effected in the presence of any suitable inert organic solvent such as dimethylformamide, tetrahydrofuran, methylene chloride and the like. Alternatively, the acylating agent utilized can itself serve as the reaction medium. In a preferred embodiment, the acylating agent, e.g. acetic anhydride, is utilized as the reaction medium. Thus, by this simple step, there is provided to the reaction zone, the medium in which the reaction can be effected as well as the necessary reaction partner.

The 3-hydroxy compounds of the formula I wherein $R_6$ is hydroxy can be obtained from the corresponding compounds of the formula I or Ia above wherein $R_6$ is lower alkanoyloxy by gently warming the latter in the presence of an aqueous solution of acid or base. Among the many bases which may be present in the reaction zone to effect the desired hydrolysis, there can be included sodium hydroxide, potassium hydroxide and the like. The removal of the acyl group preferably occurs at slightly elevated temperatures, although temperature is not critical.

Compounds of the formula I wherein $R_6$ is lower alkanoyloxy can also be converted into the corresponding compounds of the formula I wherein $R_6$ is hydroxy by acid hydrolysis.

Said acid hydrolysis can be advantageously effected by treating the compound of the formula I wherein $R_6$ is lower alkanoyloxy with an aqueous solution of a mineral acid such as hydrochloric acid, hydrobromic acid, sulfuric acid and the like or an organic acid such as toluenesulfonic acid or the like. The hydrolysis with acid is also suitably effected by gentle warming, but such is not critical and the hydrolysis can be conducted at room temperature or higher or lower temperatures.

Said acid or basic hydrolysis can suitably be effected in an aqueous medium containing an organic solvent such as dioxane, tetrahydrofuran or like organic solvents. All that is required of the organic solvent is that it be miscible with water.

Similarly, compounds Ia wherein $R_6$ is lower alkanoyloxy can be converted into corresponding compounds of the formula Ia wherein $R_6$ is hydroxy.

Compounds of the formula I above wherein $R_1$ is hydrogen can also be prepared from the corresponding compounds of the formula

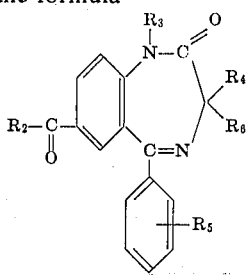

IV wherein $R_2$, $R_3$, $R_4$, $R_5$ and $R_6$ are as above by reducing the 7-lower alkanoyl group of the compounds of the formula IV to the 7-hydroxy lower alkyl group.

In one such preparative approach, a compound of the formula I above wherein $R_1$ is hydrogen can be prepared by treating a compound of the formula IV above with a mild reducing agent such as a metal borohydride. Representative of metal borohydride useable for this purpose include, preferentially, alkali metal borohydrides such as sodium borohydride. Magnesium borohydride can also be efficaciously utilized. By the use of a mild reductant such as a metal borohydride, the reduction of the carbonyl group in position-7 of the compound of the formula IV occurs without substantially effecting the other reduceable moieties present in the molecule under the reaction conditions employed.

The reduction with metal borohydrides preferably proceeds in an inert organic solvent. Among the many inert organic solvents that may be advantageously utilized, there can be included lower alkanols such as methanol, ethanol, propanol and the like, ethers such as tetrahydrofuran and the like, dimethylsulfoxide, dimethylformamide and/or any other suitable inert organic solvent. Preferably, the reduction is effected at a temperature from about −20° to about 80°. In the most preferred process aspect, this reduction is effected at about a temperature range of from about 0°C. to about 25°C., most preferably at about room temperature.

In an alternate process aspect, compounds of the formula IV above wherein $R_3$ is hydrogen and $R_6$ is hydroxy can be treated with a lower alkyl lithium ($R_1$Li) in the manner described more fully hereinafter to obtain a corresponding compound of the formula I wherein $R_1$ is lower alkyl and $R_6$ is hydroxy. The most advantageous of the lower alkyllithiums for the purposes of the present invention is methyl lithium. However, other lower alkyl lithiums can also be utilized such as ethyl lithium, propyl lithium, butyl lithium, pentyl lithium, and the like.

In a preferred embodiment, the reaction utilizing a lower alkyl lithium is carried out in the presence of an inert solvent. It will be appreciated that the use of such type solvent will ordinarily allow the reaction to proceed in a relatively simple manner, thereby avoiding the use of extraordinary conditions, extensive equipment and the like. Inert solvents capable of functioning efficaciously in this process step include benzene, tetrahydrofuran, dioxane and the like or any other appropriate inert solvent. Suitably, the reaction proceeds at temperatures much below room temperature. A preferred reaction temperature range is from about −100° to about 0°, most preferably between −80° to −50°.

The compounds of the formula I above, wherein $R_6$ is hydroxy can be prepared directly from the compound of the formula IV above wherein $R_6$ is lower alkanoyloxy by having present in the reaction zone in addition to a reducing agent of the type described above, a substance which is capable of hydrolyzing the acyl moiety of the lower alkanoyloxy group at $R_6$. Conveniently, a reaction medium containing tetrahydrofuran and methanol, a metal borohydride, such as sodium borohydride and a base such as sodium hydroxide can be efficaciously utilized. In this manner, the reduction of the 7-acyl substituent to the corresponding 7-hydroxy lower alkyl grouping and hydrolysis to the 3-hydroxy group occurs concurrently. It has been observed that when proceeding accordingly, there may be obtained a mixture of a compound of the formula I above wherein $R_6$ is lower alkanoyloxy and a compound of the formula I above wherein $R_6$ is hydroxy.

It is, of course, to be understood that a compound of the formula IV wherein $R_6$ is lower alkanoyloxy can be reduced to the corresponding compound of the formula I wherein $R_6$ is lower alkanoyloxy and the resultant compound can be deacylated in the manner described above to the corresponding compound of the formula I wherein $R_6$ is hydroxy. As is evident from the above, the hydroxy compound can also be conveniently obtained in a single step from a compound of the formula IV wherein $R_6$ is lower alkanoyloxy.

The compound of the formula IV can be prepared starting with the known compound of the formula

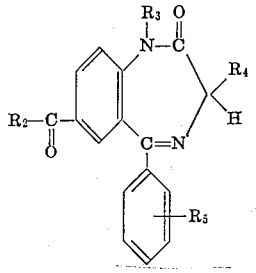

V wherein $R_2$, $R_3$, $R_4$ and $R_5$ are as above by first oxidizing a compound of the formula V above in the same manner as described above in connection with the conversion of a compound of the formula II above into the corresponding compound of the formula III.

By oxidizing a compound of the formula V accordingly, there is obtained a compound of the formula

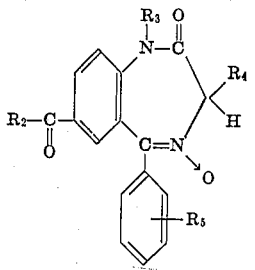

VI wherein $R_2$, $R_3$, $R_4$ and $R_5$ are as above.

The so-obtained product of the formula VI is then rearranged to the corresponding compound of the formula IV wherein $R_6$ is lower alkanoyloxy in the same manner as described above in connection with the conversion of a compound of the formula III into the corresponding compound of the formula I wherein $R_6$ is lower alkanoyloxy.

If desired, the compound of the formula IV wherein $R_6$ is lower alkanoyloxy can be deacylated to the corresponding compound of the formula IV wherein $R_6$ is hydroxy in the same manner as described above in connection with the conversion of a compound of the formula I wherein $R_6$ is lower alkanoyloxy to the corresponding compound of the formula I wherein $R_6$ is hydroxy.

Compounds of the formula I and Ia above wherein $R_3$ is hydrogen and $R_6$ is hydroxy and compounds of the formula III above wherein $R_3$ is hydrogen can be converted into the corresponding compounds of the formula I and III respectively wherein $R_3$ is lower alkyl by first forming the sodio derivative of a compound of the formula I, Ia or III above with an alkali metal alkoxide, e.g., sodium methoxide, potassium t-butoxide and the like or an alkali metal hydride, such as sodium hydride and the like and treating the so-obtained said sodio derivative with an alkylating agent such as a lower alkyl halide, e.g., methyl iodide or ethyl iodide, a dilower alkyl sulfate, such as dimethylsulfate and the like whereby alkylation of the nitrogen atom in the 1-position of the benzodiazepine results.

Compounds of the formula I can be converted into the corresponding compounds of the formula Ia above by reducing the former by any conveniently available technique. For example, the reduction of a compound of the formula I above to a compound of the formula Ia above can be effected catalytically by hydrogenation in the presence of a platinum catalyst. Also, the reduction can be effected utilizing Raney nickel. Conveniently, the reduction is effected in the presence of any suitable inert organic solvent. Among the many solvents there can be included lower alkanols such as methanol, ethanol and the like, ethers such as diethyl ether and tetrahydrofuran and similar solvents. Temperature is not critical to a successful performance of the reduction step and so the reduction can be conducted at room temperature or above or below room temperature.

As is indicated above, the compounds of the formula I, Ia and III above are useful as anti-convulsants, muscle relaxants and sedatives. Such compounds can be formulated into pharmaceutical preparations in admixture with a compatible pharmaceutical carrier and can be administered enterally or parenterally with dosages suited to fit the exirgencies of a pharmacological situation. As contemplated by this invention, the novel compounds of the formula I, Ia and III can be embodied in a pharmaceutical dosage formulation containing from about 0.5 mg. to about 200 mg. of active substance with dosage adjusted to species and individual requirements (parenteral formulations would ordinarily contain less of the active substance than compositions intended for oral administration). The novel compounds of this invention can be administered alone or in combination with pharmaceutically acceptable carriers as indicated above in a wide variety of dosage forms. Suitably, the dosage regimen consists of four tablets of 50 mg. each given daily.

In addition to compounds of the formula I, Ia and III above, there is also encompassed with the invention, the pharmaceutically acceptable salts of said compounds and the compounds of the formula I, Ia and III above can be administered in the form of such salts. The compounds of the formula I, Ia and III above form acid addition salts with pharmaceutically acceptable acids, for example, with organic or inorganic acids such as hydrochloric acid, hydrobromic acid, sulfuric acid, phosphoric acid, nitric acid, citric acid, tartaric acid, salicylic acid, ascorbic acid, maleic acid, formic acid and the like.

Solid preparations of compounds of the formula I, Ia and III above or salts thereof for oral administration can include tablets, capsules, powders, granules, emulsions, suspensions and the like. The solid preparations may comprise an inorganic carrier, e.g., talc, or an organic carrier, e.g., lactose, starch. Additives such as magnesium stearate (a lubricant) can also be included. Liquid preparations containing a compound of the formula I, Ia and III above or salts thereof such as solutions, suspensions or emulsions may comprise the usual diluents such as water, petroleum jelly and the like, a suspension media such as polyoxyethylene glycols, vegetable oils and the like. They may also contain other additional ingredients such as preserving agents, stabilizing agents, wetting agents, salts for varying the osmotic pressure or buffers. They may also contain, in combination, other therapeutically useful substances.

The following examples are illustrative but not limitative of the present invention. All temperatures are

EXAMPLE 1

A suspension of 5.60 g (20.0 mmol) of 1,3-dihydro-7-(1-hydroxyethyl)-5-phenyl-2H-1,4-benzodiazepin-2-one in 50 ml of acetic acid was heated to give a clear solution. In this solution at room temperature, was dissolved 5.20 g (30.0 mmol) of m-chloroperbenzoic acid. The mixture was allowed to stand at room temperature overnight.

Acetic acid was evaporated in vacuo. The residue was partitioned between aqueous sodium bicarbonate and methylene chloride. The methylene chloride layer was dried over anhydrous sodium sulfate, then evaporated to dryness. The residue on crystallization from acetone-hexane yielded 1,3-dihydro-7-(1-hydroxyethyl)-5-phenyl-2H-1,4-benzodiazepin-2-one 4-oxide as colorless prisms, m.p. 188°–190°.

EXAMPLE 2

A suspension of 6.00 g. (20.0 mmol) of 1,3-dihydro-5-(2-fluorophenyl)-7-(1-hydroxyethyl)-2H-1,4-benzodiazepin-2-one in 50 ml acetic acid was heated to give a clear solution. In this solution, at room temperature was dissolved 5.20 g (30.0 mmol) of m-chloroperbenzoic acid. The solution was allowed to stand at room temperature overnight.

The acetic acid was removed in vacuo. The residue was partitioned between aqueous sodium bicarbonate and methylene chloride. The methylene chloride layer was dried over anhydrous sodium sulfate then evaporated to dryness. The residual gum crystallized from ether to give 1,3-dihydro-5-(2-fluorophenyl)-7-(1-hydroxyethyl)-2H-1,4-benzodiazepin-2-one 4-oxide as light yellow amorphous solid. The melting point was in the range of 125°–140°.

EXAMPLE 3

To a solution of 0.5 g (1.48 mmol) of 3-acetoxy-7-acetyl-1,3-dihydro-5-phenyl-2H-1,4-benzodiazepin-2one in 50 ml. of a 1:1 mixture of tetrahydrofuran and ethanol was added 83 mg (2.2 mmol) of sodium borohydride in one portion. The solution was left standing at room temperature for 2 hrs. A few drops of acetic acid were added until no more hydrogen evolved and the mixture was evaporated to dryness. The residue was dissolved in tetrahydrofuran and passed through a pad of silica gel (about 15 g) which was further eluted with ethyl acetate containing 10% of methanol. Evaporation of solvents gave a gum which was dissolved in tetrahydrofuran and separated by thick layer chromatography on eight 20 cm × 20 cm × 2mm silica gel plates, developed in ethyl acetate. The band corresponding to 3-acetoxy-1,3-dihydro-7-(1-hydroxyethyl)-5-phenyl-2H-1,4-benzodiazepin-2-one (Rf 0.52) was scraped together, eluted from silica gel with 10% methanol-ethyl acetate and evaporated to a gum. The gum was crystallized from acetone-hexane to give colorless needles of 3-acetoxy-1,3-dihydro-7-(1-hydroxyethyl)-5-phenyl-2H-1,4-benzodiazepin-2-one, m.p. 233°–235°.

The band corresponding to the hydroxy compound 1,3-dihydro-3-hydroxy-7-(1-hydroxyethyl)-5-phenyl-2H-1,4-benzodiazepin -2-one was collected the same way and evaporated to a gum which was crystallized from acetone-hexane to give 1,3-dihydro-3-hydroxy-7-(1-hydroxyethyl)-5-phenyl-2H-1,4-benzodiazepin-2-one of m.p. 172°–174°

3-Acetoxy-7-acetyl-1,3-dihydro-5-phenyl-2H-1,4-benzodiazepin-2-one utilized as a starting material was prepared as follows:

To a stirred solution of 8.3 g (30 mmol) of 7-acetyl-1,3-dihydro-5-phenyl-2H-1,4-benzodiazepin-2-one in 100 ml of methylene chloride was added 6 g (30 mmol) of 85% m-chloroperbenzoic acid. The reaction was stirred until a complete solution was obtained and then left at room temperature for 24 hr. The solution was concentrated to a small volume and 3.2 g of m-chlorobenzoic acid was separated by filtration. The filtrate was diluted slowly with ether and the crude crystalline reaction product melting at 193°–195°, was separated by filtration. After recrystallization from acetone, 7-acetyl-1,3-dihydro-5-phenyl-2H-1,4-benzodiazepin-2-one 4-oxide formed yellow needles melting at 208°–209°.

A mixture of 1.4 g of 7-acetyl-1,3-dihydro-5-phenyl-2H-1,4-benzodiazepin-2-one 4-oxide and 25 ml of acetic anhydride was heated on the steambath for 25 min. The solution was concentrated to dryness. Crystallization of the residue from a mixture of benzene and ether gave crude product melting at 225°–227°. After recrystallization from a mixture of methylene chloride and ether 3-acetoxy-7-acetyl-1,3-dihydro-5-phenyl-2H-1,4-benzodiazepin-2-one formed slightly yellow prisms melting at 237°–238°.

EXAMPLE 4

1,3-Dihydro-7-(1-hydroxyethyl)-5-phenyl-2H-1,4-benzodiazepin-2-one 4-oxide (100 mg, 3.38 mmol) was heated to dissolve in 3.0 ml of acetic anhydride on a steam bath. The heating was continued for 15 mins.

The mixture was chromatographed on two 20 cm × 20 cm × 2 mm silica gel plates using ethyl acetate as eluent. The bands corresponding to compound 3-acetoxy-1,3-dihydro-7-(1-hydroxyethyl)-5-phenyl-2H-1,4- benzodiazepin-2-one were isolated and eluted from silica with ethyl acetate containing 10% of methanol. Evaporation of solvents gave an oil which on crystallization from acetone-hexane gave 3-acetoxy-1,3-dihydro-7-(1-hydroxyethyl)-5-phenyl-2H-1,4-benzodiazepin-2-one as colorless amorphous solid, m.p. 229°–232°.

EXAMPLE 5

To a solution of 0.5 g (1.4 mmol) of 3-acetoxy-7-acetyl-1,3-dihydro-5-(2-fluorophenyl)-2H-1,4- benzodiazepin-2-one in 80 ml of a 1:1 mixture of tetrahydrofuran and ethanol was added 80 mg (2.1 mmol) of sodium borohydride in one portion. The mixture was stirred at room temperature for 2 hrs. A few drops of acetic acid were then added until no more hydrogen evolved. The mixture was evaporated to dryness. The residue was partitioned between methylene chloride and water. The methylene chloride layer was washed with water, dried over anhydrous sodium sulfate and evaporated to dryness. The residue was dissolved in methylene chloride and separated by thick layer chromatography on four 20 cm × 20 cm × 2 mm silica gel plates developed in ethyl acetate. The band corresponding to the acetoxy compound (Rf 0.55) was scraped together, eluted from silica gel with ethyl acetate containing 10% methanol and evaporated to a gum. The gum was crystallized from acetone-hexane to give colorless amorphous 3-acetoxy-1,3-dihydro-5-(2-fluorophenyl)-7-(1-hydroxyethyl)-2H-1,4-benzodiazepin-2-one, m.p. 213°–215°.

The band corresponding to the hydroxy compound (Rf 0.4) was collected in the same way and evaporated to a gum which was crystallized from methylene chloride to give the desired product 1,3-dihydro-5-(2-fluorophenyl)-3-hydroxy-7-(1-hydroxyethyl)-2H-1,4-benzodiazepin-2-one, m.p. 120°–140°.

3-Acetoxy-7-acetyl-1,3-dihydro-5-(2-fluorophenyl)-2H-1,4-benzodiazepin-2-one utilized above was prepared as follows:

To a stirred suspension of 29.6 g (0.1 mol) of 7-acetyl-1,3-dihydro-5-(2-fluorophenyl)-2H-1,4-benzodiazepin-2-one in 600 ml of methylene chloride was added 25 g (0.12 mol) of 85% m-chloroperoxybenzoic acid. The mixture was stirred for about 15 mins. until a clear solution was obtained and then left standing at room temperature for 20 hr. The methylene chloride solution was washed with ice cold dilute sodium bicarbonate, separated, dried and concentrated to dryness. The residue was crystallized from acetone and gave crude product melting at 210°–212° dec. After recrystallization from the same solvent, 7-acetyl-1,3-dihydro-5-(2-fluorophenyl)-2H-1,4-benzodiazepin-2-one 4-oxide formed colorless plates melting at 215°–216° d.

A suspension of 6.2 g. (20 mmol) of 7-acetyl-1,3-dihydro-5-(2-fluorophenyl)-2H-1,4-benzodiazepin-2-one 4-oxide in 100 ml of acetic anhydride was heated on a steambath for 45 mins. until a complete solution had formed. The reaction mixture was cooled in an ice bath and crude crystalline product melting at 264°–265° was separated by filtration. After recrystallization from acetone the 3-acetoxy-7-acetyl-1,3-dihydro-5-(2-fluorophenyl)-2H-1,4-benzodiazepin-2-one formed colorless needles melting at 267°–268°.

EXAMPLE 6

1,3-Dihydro-5-(2-fluorophenyl)-7-(1-hydroxyethyl)-2H-1,4-benzodiazepin-2-one 4-oxide (100 mg, 3.38 mmol) was heated with 3.0 ml of acetic anhydride on a steam bath for 15 mins.

The solution was chromatographed on two 20 cm × 20 cm × 2 mm silica gel plates, using ethyl acetate as eluent. The bands corresponding to compound 3-acetoxy-1,3-dihydro-5-(2-fluorophenyl)-7-(1-hydroxyethyl)- 2-H-1,4-benzodiazepin-2-one were isolated and eluted from silica gel with ethyl acetate containing 10% of methanol. Evaporation of solvents gave an oil which on crystallization from acetone-hexane gave 3-acetoxy-1,3-dihydro-5-(2-fluorophenyl)-7-(1-hydroxyethyl)-2H-1,4-benzodiazepin-2-one as a colorless amorphous solid, m.p. 205°–208°.

EXAMPLE 7

A mixture of 1.18 g (4.0 mmol) of 7-acetyl-1,3-dihydro-3-hydroxy-5-phenyl-2H-1,4-benzodiazepin-2-one, 0.228 g (6.0 mmol) of sodium borohydride, 60 ml of ethanol and 60 ml of tetrahydrofuran was stirred at room temperature. In 20 mins. a clear solution formed. After 2 hrs, the excess hydride was decomposed with a few drops of acetic acid. Solvents were evaporated. Trituration of the residue with about 30 ml of water followed by standing, gave a nearly colorless solid, m.p. 167–175°. On recrystallization from acetone-hexane, two crops of faintly yellow needles were obtained: first crop, m.p. 178°–180°; second crop m.p. 171°–172°. The crops were combined and colorless needles of 7-(1-hydroxyethyl)-1,3-dihydro-3-hydroxy-5-phenyl-2H-1,4-benzodiazepin-2-one were obtained by recrystallizations from acetone-hexane, m.p. 172°–174°.

The 7-acetyl-3-hydroxy-1,3-dihydro-5-phenyl-2H-1,4-benzodiazepin-2-one utilized as a starting material was prepared as follows:

To a stirred solution of 1.7 g of 3-acetoxy-7-acetyl-1,3-dihydro-5-phenyl-2H-1,4-benzodiazepin-2-one in 40 ml of dioxane was added 10 ml of 1 N sodium hydroxide. The reaction mixture was stirred at room temperature for 0.5 hr. A crystalline precipitate had formed which dissolved after the addition of 10 ml of 1 N hydrochloric acid. The solution was concentrated to a small volume. Water was added to the oily residue and the mixture was extracted with methylene chloride. The organic extract was dried and concentrated in vacuo to dryness. Crystallization of the residue from acetone gave the product and after recrystallization from the same solvent gave 7-acetyl-3-hydroxy-1,3-dihydro-5-phenyl-2H-1,4-benzodiazepin-2-one as colorless needles melting point 209°–210°.

EXAMPLE 8

A mixture of 1.252 g (4.0 mmol) of 7-acetyl-1,3-dihydro-5-(2-fluorophenyl)-3-hydroxy-2H-1,4-benzodiazepin-2-one, 0.228 g (6.0 mmol) of sodium borohydride, 40 ml. of ethanol and 40 ml. of tetrahydrofuran was stirred at room temperature. In 15 mins., a clear solution formed. After 2 hrs., excess hydride was decomposed by the addition of a few drops of acetic acid. Solvents were evaporated. The residue was stirred with a mixture of about 3 ml of water and 30 ml of tetrahydrofuran. Anhydrous sodium sulfate was added to retain the aqueous salt solution. The tetrahydrofuran solution was decanted. The wet salty mass was washed three times by decantation with tetrahydrofuran. The combined tetrahydrofuran solution was filtered through a pad of silica gel, which was then washed with 100 ml of ethyl acetate containing 10% of methanol. Evaporation of solvents yielded a gum. The gum was dissolved in 50 ml of boiling methylene chloride. The hot solution was filtered to remove a trace of insoluble material. On concentration to about 20 ml followed by chilling, the solution yielded 1,3-dihydro-5-(2-fluorophenyl)-3-hydroxy-7-(1-hydroxyethyl)-2H-1,4-benzodiazepin-2-one as colorless needles, in the range of 125°–140°.

EXAMPLE 9

To a solution of 0.5 g (1.4 mmol) of 3-acetoxy-7-acetyl-1,3-dihydro-5-(2-fluorophenyl)-2H-1,4-benzodiazepin-2-one in 80 ml of a 1:1 mixture of tetrahydrofuran and ethanol was added 80 mg (2.1 mmol) of sodium borohydride in one portion. Then 3 ml of 1 N sodium hydroxide was added and the mixture was stirred at room temperature for 1.5 hrs. A few drops of acetic acid were added until no more hydrogen evolved. The mixture was evaporated to dryness. The residue was partitioned between methylene chloride and water. The methylene chloride layer was washed with water, dried over anhydrous sodium sulfate and evaporated to dryness. 1,3-Dihydro-5-(2-fluorophenyl)-3-hydroxy-7-(1-hydroxyethyl)-2H-1,4-benzodiazepin-2-one in the residue was crystallized from methylene chloride to give the desired product (m.p. 120°–140°d).

EXAMPLE 10

To a solution of 1 mg of 3-acetoxy-1,3-dihydro-5-(2-fluorophenyl)-7-(1-hydroxyethyl)-2H-1,4- benzodiazepin-2-one in 10 drops of tetrahydrofuran was added 3 drops of 1 N sodium hydroxide. The mixture was left standing at room temperature for 0.5 hr. yielding 1,3-dihydro-5-(2-fluorophenyl)-3-hydroxy-7-(1-hydroxyethyl)-2H-1,4-benzodiazepin-2-one.

EXAMPLE 11

A mixture of 3 g of 7-acetyl-5-(2-fluorophenyl)-1,3-dihydro-1-methyl-2H-1,4-benzodiazepin-2-one and 3 g of 85% m-chloroperbenzoic acid in 30 ml of methylene chloride was stirred about 10 mins. until a solution formed. The solution was left standing at room temperature for 20 hrs. The reaction mixture was diluted with methylene chloride and washed with ice cold 1 N sodium hydroxide. The organic layer was separated, dried and concentrated to dryness. The residue crystallized from acetone and gave 7-acetyl-5-(2-fluorophenyl)-1,3-dihydro-1-methyl-2H-1,4-benzodiazepin-2-one 4-oxide melting at 85°–86°. After recrystallization from acetone, the melting point was unchanged. The colorless prisms were found to have crystallized with 0.6 mol acetone.

EXAMPLE 12

A suspension of 8 g of 7-acetyl-5-(2-fluorophenyl)-1,3-dihydro-1-methyl-2H-1,4-benzodiazepin-2-one 4-oxide in 30 ml of acetic anhydride was heated on a steam bath for 1 hr. The reaction mixture was concentrated to dryness. The residue crystallized from a mixture of ether and petroleum ether to give 3-acetoxy-7-acetyl-5-(2-fluorophenyl)-1,3-dihydro-1-methyl-2H-1,4-benzodiazepin-2-one, melting at 145°–147°. After recrystallization from ether the product formed colorless crystals with unchanged melting point.

EXAMPLE 13

A solution of 1.6 g of 3-acetoxy-7-acetyl-5-(2-fluorophenyl)-1,3-dihydro-1-methyl-2H-1,4-benzodiazepin-2-one in 25 ml of dioxane and 1 ml of concentrated hydrochloric acid was stirred at room temperature for 17 hrs. The reaction mixture was diluted with about 100 ml of water and the crystalline reaction product melting at 182°–183° was separated by filtration. After recrystallization from a mixture of methylene chloride, ether and petroleum ether, 7-acetyl-5-(2-fluorophenyl)-3-hydroxy-1,3-dihydro-1-methyl-2H-1,4-benzodiazepin-2-one formed colorless rods melting at 188°–189°.

EXAMPLE 14

7-Acetyl-5-(2-fluorophenyl)-3-hydroxy-1,3-dihydro-1-methyl-2H-1,4-benzodiazepin-2-one so prepared was converted into 5-(2-fluorophenyl)-3-hydroxy-7-(1-hydroxyethyl)-1,3-dihydro-1-methyl-2H-1,4-benzodiazepin-2-one by a procedure analogous to that described in Example 9.

EXAMPLE 15

A 25 mg. capsule containing the following:

|  | mg/capsule |
|---|---|
| 1,3-Dihydro-3-hydroxy-7-(1-hydroxyethyl)-5-phenyl-2H-1,4-benzodiazepin-2-one | 25 |
| lactose | 153 |
| corn starch | 30 |
| magnesium stearate | 2 |
| Total weight | 210 mg. | can be prepared as follows:

Blend drug with lactose, and corn starch in a suitable mixer. Pass blended mixture through a Fitzmill machine to obtain uniform mixture. Return powders to Blender, add talc and premix. Fill into empty hard shell capsule, No. 4 size on a capsule filling machine.

EXAMPLE 16

A 25 mg. tablet formulation containing the following:

|  | mg/tablet |
|---|---|
| 1,3-Dihydro-3-hydroxy-7-(1-hydroxyethyl)-5-phenyl-2H-1,4-benzodiazepin-2-one | 25 |
| dicalcium phosphate, dihydrate, unmilled | 150 |
| corn starch | 30 |
| microcrystalline cellulose | 23 |
| calcium stearate | 2 |
| Total weight | 230 | can be prepared as follows:

Blend ingredients (except the calcium stearate) in a suitable mixer. Pass the mixture through a Fitzmill using a 1A screen at medium speed. Return to mixer and add calcium stearate. Compress on a pallet machine.

We claim:

1. A compound of the formula

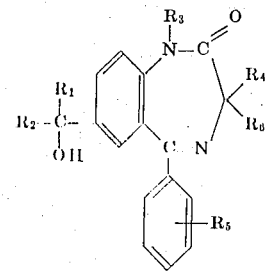

wherein $R_1$, $R_2$, $R_3$ and $R_4$ are each selected from the group consisting of hydrogen and lower alkyl, $R_5$ is selected from the group consisting of hydrogen and halogen and $R_6$ is selected from the group consisting of lower alkanoyloxy and hydroxy.

2. A compound as defined in claim 1 wherein $R_1$ and $R_4$ are hydrogen.

3. A compound as defined in claim 2 wherein $R_2$ is methyl, $R_3$ is selected from the group consisting of hydrogen and methyl and $R_5$ is selected from the group consisting of hydrogen, chlorine and fluorine as is joined to the phenyl ring in the 2-position thereof.

4. A compound as in claim 3 wherein $R_6$ is hydroxy and $R_5$ is hydrogen or fluorine.

5. A compound as defined in claim 4 of the formula 1,3-dihydro-3-hydroxy-7-(1-hydroxyethyl)-5-phenyl-2H-1,4-benzodiazepin-2-one.

6. A compound as defined in claim 4 of the formula 1,3-dihydro-3-hydroxy-7-(1-hydroxyethyl)-5-(2-fluorophenyl)-2H-1,4-benzodiazepin-2-one.

7. A compound as defined in claim 3 wherein $R_6$ is acetoxy.

8. A compound as defined in claim 7 of the formula 3-acetoxy-1,3-dihydro-7-(1-hydroxyethyl)-5-phenyl-2H-1,4-benzodiazepin-2-one.

9. A compound as defined in claim 7 of the formula 3-acetoxy-1,3-dihydro-5-(2-fluorophenyl)-7-(1-hydroxyethyl)-2H-1,4-benzodiazepin-2-one.

10. A compound of the formula

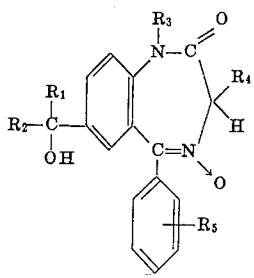

wherein $R_1$, $R_2$, $R_3$ and $R_4$ are each selected from the group consisting of hydrogen and lower alkyl and $R_5$ is selected from the group consisting of hydrogen and halogen.

11. A compound as defined in claim 10 wherein $R_1$ and $R_4$ are hydrogen.

12. A compound as defined in claim 11 wherein $R_2$ is methyl, $R_3$ is selected from the group consisting of hydrogen and methyl and $R_5$ is selected from the group consisting of hydrogen and fluorine.

13. A compound as defined in claim 12 of the formula 1,3-dihydro-7-(1-hydroxyethyl)-5-(2-fluorophenyl)-2H-1,4-benzodiazepin-2-one 4-oxide.

14. A compound as defined in claim 12 of the formula 1,3-dihydro-7-(1-hydroxyethyl)-5-phenyl-2H-1,4-benzodiazepin-2-one 4-oxide.

15. A compound of the formula

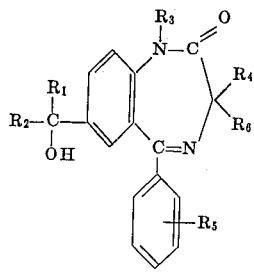

wherein $R_1$, $R_2$, $R_3$ and $R_4$ are each selected from the group consisting of hydrogen and lower alkyl, $R_5$ is selected from the group consisting of hydrogen and halogen and $R_6$ is selected from the group consisting of lower alkanoyloxy and hydroxy.

* * * * *

UNITED STATES PATENT AND TRADEMARK OFFICE
CERTIFICATE OF CORRECTION

PATENT NO. : U.S. Patent No. 3,846,410
DATED : November 5, 1974
INVENTOR(S) : Robert Ye-Fong Ning and Leo Henryk Sternbach It is certified that error appears in the above-identified patent and that said Letters Patent are hereby corrected as shown below:

Column 12, line 49 "as" should be and.

Column 14, line 10 " $\diagdown C = N \diagup$ " should be $\diagdown CH - NH \diagup$ .

Signed and Sealed this

Twenty-seventh Day of July 1976

[SEAL]

Attest:

RUTH C. MASON
*Attesting Officer*

C. MARSHALL DANN
*Commissioner of Patents and Trademarks*